2,898,378
Patented Aug. 4, 1959

2,898,378

UNSATURATED ETHERS

Frank G. Young, Charleston, W. Va., assignor to Union Carbide Corporation, a corporation of New York No Drawing. Application May 31, 1956
Serial No. 588,215

14 Claims. (Cl. 260—611)

The present invention relates to ethers and to a method of preparing the same. More particularly this invention concerns the preparation of unsaturated ethers by reacting hydroxy containing unsaturated organic compounds in the presence of a suitable catalyst.

According to heretofore customary procedures it was known to prepare alkyl ethers from the reaction of an alkyl halide with an alkali metal salt of an alkyl alcohol. This classical reaction, as well as variations of it, are still extensively used. Another procedure for producing alkyl ethers is by reacting an alkyl halide with mercuric oxide.

These foregoing processes suffer from the disadvantage of using the expensive halides of the alkyl alcohols as one of the reactants and require an equivalent amount of a basic reagent which is not recoverable, and in some of the variations, the reactions are limited to the preparation of ethers in which the radicals are identical. Further, none of these reactions are catalytic in nature.

Other known methods start from the alkyl alcohol and employ reagents such as sulfuric acid and concentrated hydrochloric acid with zinc chloride. According to still another known process, the alcohol is heated with iodine in a vacuum. These latter non-catalytic reactions have the disadvantage, primarily, of employing corrosive dehydrating agents.

Mailhe and deGordon, Bull. Soc. Chim. (4), vol. 27, page 328 (1920), teach the preparation of dialkyl ether by passage of alkyl alcohol vapor over alumina at raised temperatures, and while this is a catalytic process it gives only a low yield of ether.

The use of mercuric oxide as a promoter for boron trifluoride has been extensively described for the preparation of acetals and ketals by addition of alcohols to acetylene.

The production of ethers using boron trifluoride promoted with mercuric oxide by hydration of olefins and the addition of alcohol to an olefin is also known.

The process of the present invention comprises forming a mixture of alcohols containing a carbon-to-carbon double bond between the carbon atoms adjacent to the hydroxy containing carbon, said double bonds being subject to a prototropic shift, and a catalyst composed of a mercury salt and an acidic compound containing boron and fluorine to cause the production of unsaturated ethers containing ordinarily carbon-to-carbon double bonds in the carbon atoms adjacent to the oxygen linked carbons contained therein. The water, which is also a product of the reaction, is removed. The reaction may take place at room temperature, and where necessary or desirable, the reaction rate can be increased by raising the temperature. The catalyst is prepared, either in situ or separate from the reactant alcohols, by mixing a solution of an acidic compound, such as boron trifluoride in diethyl ether with a mercury salt, for example mercuric oxide. If prepared separately, the catalyst mixture may be warmed to effect solution of the mercuric oxide. This is not necessary, however, as solution of the catalyst in the reaction mix soon occurs in any case.

The phrase "alcohols containing a carbon-to-carbon double bond between the carbon atoms adjacent to the hydroxy containing carbon atom" as it is employed throughout this specification is intended to embrace alcohols of the type

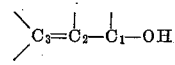

wherein substituents on the three carbons may be either hydrogen or lower alkyl groups containing 1 to 4 carbon atoms. Carbon atoms 1, 2 and 3 may also be taken as part of a ring system, singly, except carbon atom 2; by adjacent pairs; or altogether, i.e.

(a) Carbon atom 1 alone;

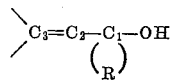

(b) Carbon atom 3 alone;

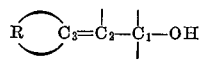

(c) Carbon atoms 1 and 2 together;

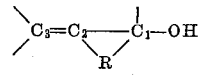

(d) Carbon atoms 2 and 3 together;

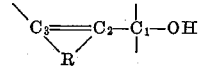

(e) All three carbon atoms together;

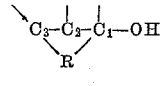

where the symbol "R" denotes a ring formed including the carbon atoms to which the symbol is attached. The alcohols cannot be tertiary ones possessing hydrogen on the carbon atoms adjacent the hydroxy containing carbon. Thus encompassed within this term are the primary allylic alcohols and primary alcohols having an allylic structural grouping, for example allyl alcohol, 2-ethyl-2-hexenol-1, crotyl alcohol, methallyl alcohol, 2-methyl-3,4,5,6-tetrahydrobenzyl alcohol and benzyl alcohol; secondary allylic alcohols and secondary alcohols having an allylic structural grouping, for example, 2-cyclopentenol, 3-penten-2-ol, 2-cyclohexenol, 3-methyl-3-penten-2-ol, 2-cyclohexylidene cyclohexanol, 2-ethylidene cyclohexanol, 3-hepten-2-ol, 4-methyl-4-hexen-3-ol, and methyl phenyl carbinol; and tertiary allylic alcohols in which hydrogen is not present on the carbon in the beta position relative to the hydroxy containing carbon atom, for example, 1-isopropenyl-2,2,6,6-tetramethylcyclohexanol and triphenylcarbinol.

It will be apparent that the phrase "unsaturated ether containing carbon-to-carbon double bonds between the carbon atoms adjacent to the oxygen linked carbons" as used throughout this specification is meant to encompass the etheric condensation products of the alcohols as described immediately above. The two alcohol groups contributing to the product ether may be the same or different in a single reaction.

Novel ethers prepared in accordance with the practice of this invention are bis(2-ethyl-2-hexenyl)ether and allyl 2-cyclopentenyl ether, the preparation of which is disclosed in Examples 3 and 5 respectively which appear hereinafter. In alcohols where the grouping

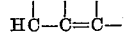

is present, a prototropic shift i.e.

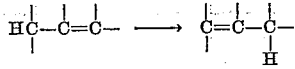

may occur in the product ether due to the influence of the catalyst, and ethers isomeric with those expected may be produced and are also included within the scope of this term.

The catalyst employed herein, is one prepared, preferably, from boron trifluoride and mercuric oxide. The nature of this catalytic agent or activator is not, however, precisely known. It has been reported that when boron trifluoride is mixed with methyl alcohol a coordination compound, $CH_3OHBF_3$ is formed and that a mercury derivative of this compound, mercuric methoxyfluoborate, $Hg(CH_3OBF_3)_2$, was isolated. Since boron trifluoride reacts in a similar manner with other alcohols, it is conceivable that some mercuric allyloxy fluoborate, $Hg(CH_2=CH-CH_2OBF_3)_2$ is present in carrying out my process. Other compounds of mercury and the hydrolysis products of boron trifluoride are known, such as monoaquomonohydrofluoromercury (I) fluoborate, $$[Hg(HF)(H_2O)]BF_4$$

and mercuric fluoborate, $Hg(BF_4)_2$. These and other mercurous and mercuric salts of acidic compounds of boron and fluorine may be used as the actual catalyst in the reaction solution. Examples of these are mercuric dihydroxyfluorborate; mercuric methoxyfluorborate; the addition compound of mercuric dihydroxyfluorborate and boron trifluoride; and the addition compound of boron trifluoride etherate, mercuric oxide and trichloroacetic acid.

The amount of catalyst to be employed is not narrowly critical and may be varied considerably without adversely affecting the reaction. While no advantage can be seen from increasing the concentrations of catalyst over those shown in the examples following, a less preferred limit within the scope of the present invention permits use of 0.01 percent of mercuric oxide and 0.03 percent of boron trifluoride or equivalent amounts of other mercurous and mercuric salts of acidic compounds of boron and fluorine by weight of the reactant alcohols. Below these limits the rate of reaction is considerably reduced. The upper limit for catalyst concentration is an economic rather than a chemical one. No advantage or necessity is seen in employing catalyst concentrations higher than 3 percent mercuric oxide and 2 percent boron trifluoride, again, by weight of the reactant alcohols.

The catalytic agent or activator not only accelerates the rate of the chemical reaction by which the allylic type ethers are prepared, but serves also to direct the course of the reaction so that a preponderant yield of the desired allylic ether product is secured.

Any neutral organic hydrocarbon solvent may be employed for the reaction although it should be noted that the presence of a solvent is neither critical nor necessary in the practice of the present invention, for example, aliphatic hydrocarbons, e.g. hexane and petroleum ether; ethers, e.g. di-n-butyl ether, diethyl ether and chlorinated hydrocarbons, e.g. ethylene dichloride and methylene dichloride.

Separation of the water of reaction occurs on standing of the reaction mixture at room temperature or somewhat above, and the insoluble diallyl ethers then appear as a separate phase. The reaction may be hastened or driven farther toward completion by removal of the water by a suitable dehydrating agent, such as alumina, or by distillation with a chemically inert material such as, for example, hexane or toluene, forming an azeotrope with water. Similar processes may be applied to removal of the product ethers. When the reaction is complete the catalyst is generally neutralized with a base and the ethers are recovered by a suitable distillation procedure.

The preferred temperature range for obtaining a satisfactory yield of the product ethers is between 25° C. and the boiling point of the reactant mixture at the working pressure, i.e. not above 350° C. No advantage is seen in employing temperatures substantially below 25° C., since the rate of reaction then is slowed down considerably.

It should be noted that there is nothing critical about the molar ratio of the reactants. Any mol ratio is operative and if a particular reaction is sluggish a considerable excess (e.g. one hundred fold or more) of one of the reactants may be introduced into the reaction mix.

The ethers of the present invention may be used as selective solvents and extractants. They can also be used to form copolymers with, for example, vinyl chloride or acrylonitrile which are normally suitable as plastics, coatings and films. They are of particular utility as cross-linking or vulcanizing agents in copolymers e.g. copolymers with vinyl chloride. This is especially true of allyl 2-cyclopentenyl ether, in which the two olefinic double bonds differ in chemical reactivity. The ether can be incorporated into the "backbone" of the polymer, e.g. the carbon chain of polyvinyl chloride copolymer, by copolymerization of the more reactive double bond (i.e. the unsaturated linkage of the allyl radical) with vinyl chloride monomer. The unused, less reactive, double bond of the ether (i.e. the double bond of the 2-cyclopentenyl radical) would then appear attached to the new polymer chain. By reaction with materials such as hydrogen sulfide these double bonds attached to one polymer chain may be attached to similar double bonds attached to another like polymer chain, thus cross-linking the polymer chains and vulcanizing the polymer. Bis(2-ethyl-2-hexenyl) ether copolymerized with vinyl chloride monomer, for example, and treated with hydrogen sulfide in a similar manner can be especially useful in this same regard, because of the low volatility of this ether which permits residual monomer or monomer by degradation to remain in the polymer during processing at elevated temperatures.

The following examples are illustrative of the invention, but are not to be construed as limiting the scope thereof.

*Example 1*

A mixture of 232 grams of allyl alcohol, 174 grams of acetone, 200 grams of isomeric hexanes, and a premixed catalyst consisting of 4 grams of red mercuric oxide and 4 grams of a solution of boron trifluoride in diethyl ether containing about 29 percent boron trifluoride by weight, were heated together at a temperature of 58–62° C. while removing water as a component of the lower layer of an azeotropic mixture. After 70 grams of the lower layer was removed the still kettle contents were cooled, agitated for 3 hours with finely pulverized anhydrous potassium carbonate, filtered, and fractionally distilled. There were recovered 155 grams of acetone, 175 grams of isomeric hexanes, 41 grams of unreacted allyl alcohol, and 130 grams of diallyl ether. The yield of diallyl ether was 66 percent at an efficiency based upon allyl alcohol of about 81 percent.

*Example 2*

A mixture of 232 grams of allyl alcohol, 4 grams of red mercuric oxide and 2 grams of boron trifluoride etherate was prepared. The solution stood at room temperature (26° C.) overnight (approximately 22 hours), before resuming the experiment. It was noticed that the solution of allyl alcohol and catalyst had separated into two colorless layers. The layers were separated, 2 grams of potassium carbonate was added to the upper organic layer (218 grams) and this layer was distilled. From the distillation there was recovered 130 grams, 71 percent, of diallyl ether at a quantitative efficiency based upon the allyl alcohol consumed in the process.

*Example 3*

A mixture of 256 grams (2 mols) of 2-ethyl-2-hexenol-1, 174 grams of acetone, 2.8 grams of boron trifluoride (41 percent by weight) in ether, and 4 grams of mercuric oxide was allowed to stand for 2 days. Petroleum ether (200 grams of B.P 60–75° C.) was added to the reaction mixture to help remove the water during the distillation which followed. After removing 356 grams of distillate, 2.3 grams of potassium carbonate was added to neutralize the catalyst. The distillation was continued under reduced pressure. The high-boiling cuts were redistilled to give a 70 percent yield of bis(2-ethyl-2-hexenyl) ether, a colorless liquid having a boiling range of 106–115° C. at 4 mm. pressure Hg and a refractive index, $n_D^{30}$, range of 1.4472 to 1.4536. The product appeared as a mixture of the three possible geometic isomers. The purity as judged by an unsaturation analysis (bromination) was 97 percent. This is a new product.

*Example 4*

Crotyl alcohol, B.P. 74°/100 mm. Hg, $n_D^{30}$, 1.4243 (508 grams), boron trifluoride etherate (9 grams containing 42 percent $BF_3$ by weight), and mercuric oxide (14 grams) were mixed and allowed to stand at room temperature for 16 hours. No water separated at the end of this period. Therefore, the reaction temperature was raised to 55° C. and held for 8 hours. At the end of this time, 69 grams of water was separated and the remaining organic layer was distilled. Two principal fractions were collected, a fraction of boiling range 56° C. at 109 mm. Hg to 69° C. at 100 mm., $n_D^{30}$ 1.4060–1.4220, and a fraction 60° C. at 55 mm. Hg to 80° C. at 50 mm., $n_D^{30}$ 1.4220–1.4350. The first fraction consists largely of unreacted crotyl alcohol and its isomer, while the second consists largely of isomers of dicrotyl ether caused by prototropic shift under the influence of the acidic catalyst.

*Example 5*

A solution of 126 grams (1.5 mols) 2-cyclopentenol and 174 grams (3.0 mols) allyl alcohol was stirred with 4.0 grams mercuric oxide and 2.8 grams boron trifluoride dietherate for four hours at room temperature, and allowed to stand for 48 hours. After neutralization with 2.4 grams potassium carbonate, the water was distilled at reduced pressure, the solution filtered, and the filtrate fractionated giving 137 grams (74 percent) of allyl 2-cyclopentenyl ether, B.P. 73°/50 mm., $n_D^{30}$ 1.4550. The product was 98.0 percent pure by bromide titration.

I claim:
1. A method of producing ethers which comprises forming a mixture of alcohols, other than tertiary alcohols possessing hydrogen on the carbon atoms adjacent to the hydroxy containing carbon, and containing a carbon-to-carbon double bond between the carbon atoms adjacent to the hydroxy containing carbon and a catalyst composed of a mercury salt and an acidic compound containing boron and fluorine and heating to a temperature from 25° C. to the boiling point of said mixture.
2. A method of producing ethers which comprises forming a mixture of alcohols, other than tertiary alcohols possessing hydrogen on the carbon atoms adjacent to the hydroxy containing carbon, and containing a carbon-to carbon double bond between the carbon atoms adjacent to the hydroxy containing carbon and mercury salt of an acidic compound containing boron and fluorine, as a catalyst therefor and heating to a temperature from 25° C. to the boiling point of said mixture.
3. A method of producing ethers which comprises forming a mixture of alcohols, other than tertiary alcohols possessing hydrogen on the carbon atoms adjacent to the hydroxy containing carbon, and containing a carbon-to-carbon double bond between the carbon atoms adjacent to the hydroxy containing carbon and a mercury salt of an acidic compound containing boron and fluorine, as a catalyst therefor, and heating to a temperature from 25° C. to the boiling point of said mixture.
4. A method of producing ethers which comprises forming a mixture of alcohols, other than tertiary alcohols possessing hydrogen on the carbon atoms adjacent to the hydroxy containing carbon, and containing a carbon-to-carbon double bond between the carbon atoms adjacent to the hydroxy containing carbon and mercurous salt of an acidic compound containing boron and fluorine, as a catalyst therefor and heating to a temperature from 25° C. to the boiling point of said mixture.
5. A method of producing ethers which comprises forming a mixture of alcohols, other than tertiary alcohols possessing hydrogen on the carbon atoms adjacent to the hydroxy containing carbon, and containing a carbon-to-carbon double bond between the carbon atoms adjacent to the hydroxy containing carbon, and mercuric salt of an acidic compound containing boron and fluorine, as a catalyst therefor and heating to a temperature from 25° C. to the boiling point of said mixture.
6. A method of producing ethers which comprises forming a mixture of alcohols, other than tertiary alcohols possessing hydrogen on the carbon atoms adjacent to the hydroxy containing carbon, and containing a carbon-to-carbon double bond between the carbon atoms adjacent to the hydroxy containing carbon and a catalyst composed of mercuric oxide and boron trifluoride and heating to a temperature from 25° C. to the boiling point of said mixture.
7. A method of producing ethers which comprises forming a mixture of alcohols, other than tertiary alcohols possessing hydrogen on the carbon atoms adjacent to the hydroxy containing carbon, and containing a carbon-to-carbon double bond between the carbon atoms adjacent to the hydroxy containing carbon and a catalyst composed of mercuric oxide and boron trifluoride etherate and heating to a temperature from 25° C. to the boiling point of said mixture.
8. A method of producing ethers which comprises forming a mixture of allyl alcohol, a neutral organic solvent, and a catalyst composed of a mercury salt of an acidic compound containing boron and fluorine and heating to a temperature from 25° C. to the boiling point of said mixture.
9. A method of producing ethers which comprises forming a mixture of crotyl alcohol, a neutral organic solvent, and a catalyst composed of a mercury salt of an acidic compound containing boron and fluorine, and heating to a temperature from 25° C. to the boiling point of said mixture.
10. A method of producing ethers which comprises forming a mixture of 2-ethyl-2-hexenol-1, a neutral organic solvent, and a catalyst composed of a mercury salt of an acidic compound containing boron and fluorine, and heating to a temperature from 25° C. to the boiling point of said mixture.
11. A method of producing ethers which comprises forming a mixture of allyl alcohol, 2-cyclopentenol, a neutral organic solvent, and a catalyst composed of a mercury salt of an acidic compound containing boron and fluorine and heating to a temperature from 25° C. to the boiling point of said mixture.
12. A member selected from the group consisting of bis(2-ethyl-2-hexenyl)ether and allyl 2-cyclopentenyl ether.

13. Bis(2-ethyl-2-hexenyl)ether.
14. Allyl 2-cyclopentenyl ether.

References Cited in the file of this patent
UNITED STATES PATENTS 2,847,477  Watanabe et al. _____ Aug. 12, 1958

OTHER REFERENCES

Beilstein: Handbuch der Organ. Chemie, Erster Band (1918), p. 446, "dihexenyläther."
Chem. Abstracts, vol. 29, col. 8229, Takei et al. (1935).
Booth et al., Boron trifluoride and its Derivatives, pp. 176, 195 (1949).

UNITED STATES PATENT OFFICE
Certificate of Correction

August 4, 1959

Patent No. 2,898,378  Frank G. Young

It is hereby certified that error appears in the printed specification of the above numbered patent requiring correction and that the said Letters Patent should read as corrected below.

Column 1, line 41, for "deGordon" read —deGodon—; column 2, lines 41 to 43, inclusive, the formula should read as shown below instead of as in the patent:

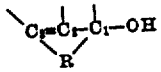

column 5, line 31, for "74°/100 mm." read —73°/100 mm.—; line 58, for "bromide" read —bromine—.

Signed and sealed this 10th day of May 1960.

[SEAL]

Attest:
KARL H. AXLINE,
Attesting Officer.

ROBERT C. WATSON,
Commissioner of Patents.